(12) United States Patent
Wei et al.

(10) Patent No.: US 9,776,872 B2
(45) Date of Patent: *Oct. 3, 2017

(54) METHOD FOR TRANSFERRING CARBON NANOTUBE ARRAY AND METHOD FOR FORMING CARBON NANOTUBE STRUCTURE

(71) Applicants: Tsinghua University, Beijing (CN); HON HAI PRECISION INDUSTRY CO., LTD., New Taipei (TW)

(72) Inventors: Yang Wei, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 563 days.

This patent is subject to a terminal disclaimer.

(21) Appl. No.: 14/316,752

(22) Filed: Jun. 26, 2014

(65) Prior Publication Data
US 2015/0291427 A1    Oct. 15, 2015

(30) Foreign Application Priority Data
Apr. 14, 2014 (CN) .......................... 2014 1 0147435

(51) Int. Cl.
*B82Y 40/00* (2011.01)
*C01B 31/00* (2006.01)
(Continued)

(52) U.S. Cl.
CPC ............... *C01B 31/0253* (2013.01)

(58) Field of Classification Search
CPC ......... B82Y 40/00; C01B 31/00; C01B 31/02; C01B 31/025; C01B 31/0253; B32B 3/00;
(Continued)

(56) References Cited

U.S. PATENT DOCUMENTS 8,048,256 B2   11/2011   Feng et al.
8,068,626 B2 *  11/2011  Jiang ................... H04R 23/002
                                              381/164
(Continued)

FOREIGN PATENT DOCUMENTS

CN    101239712    8/2008
CN    101506413    8/2009
(Continued)

OTHER PUBLICATIONS

"Superaligned Carbon Nanotube Arrays, Films, and Yarns: A Road to Applications", Kaili Jiang et al.. Advanced Materials, vol. 23, pp. 1154-1161.

(Continued)

*Primary Examiner* — Jacob T Minskey
*Assistant Examiner* — Matthew Hoover
(74) *Attorney, Agent, or Firm* — Steven Reiss

(57) ABSTRACT

A method for transferring a carbon nanotube array includes providing a substitute substrate, a growing substrate, and a carbon nanotube array. The carbon nanotube array is grown on the growing substrate. The substitute substrate has a surface having microstructures located thereon. A carbon nanotube structure can be drawn from the carbon nanotube array. The carbon nanotube structure includes carbon nanotube segments joined end-to-end. The carbon nanotube array is transferred from the growing substrate onto the substitute substrate. During transfer, the structural integrity of the carbon nanotube array is maintained.

14 Claims, 10 Drawing Sheets

(51) Int. Cl.
*B32B 3/00* (2006.01)
*B32B 27/00* (2006.01)
*B32B 15/00* (2006.01)
*C01B 31/02* (2006.01)

(58) Field of Classification Search
CPC  B32B 3/10; B32B 27/00; B32B 27/06; B32B 15/00; B32B 15/04
See application file for complete search history.

(56) References Cited

U.S. PATENT DOCUMENTS

| | | | |
|---|---|---|---|
| 8,101,953 | B2 | 1/2012 | Jiang et al. |
| 8,247,036 | B2 | 8/2012 | Jiang et al. |
| 8,248,377 | B2 | 8/2012 | Jiang et al. |
| 8,269,932 | B2 | 9/2012 | Fu et al. |
| 2008/0248235 | A1 | 10/2008 | Feng et al. |
| 2010/0075024 | A1 | 3/2010 | Ajayan et al. |
| 2010/0170891 | A1 | 7/2010 | Feng et al. |
| 2011/0039075 | A1 | 2/2011 | Feng et al. |
| 2011/0140309 | A1 | 6/2011 | Liu et al. |
| 2011/0171419 | A1 | 7/2011 | Li et al. |
| 2011/0233816 | A1 | 9/2011 | Liu |
| 2012/0321785 | A1* | 12/2012 | Rogers .......... B82Y 10/00 427/249.1 |
| 2013/0026679 | A1 | 1/2013 | Chen et al. |
| 2013/0255565 | A1 | 10/2013 | Wei et al. |
| 2013/0280515 | A1* | 10/2013 | Daraio .......... B32B 3/10 428/293.1 |
| 2015/0274520 | A1* | 10/2015 | Wei .......... C01B 31/0253 156/230 |

FOREIGN PATENT DOCUMENTS

| | | |
|---|---|---|
| CN | 101870463 | 10/2010 |
| CN | 101993055 | 3/2011 |
| CN | 102598191 | 7/2012 |
| TW | 200741747 | 11/2007 |
| TW | 201020204 | 6/2010 |
| TW | 201125042 | 7/2011 |
| TW | 201125814 | 8/2011 |
| TW | 201125814 A | 8/2011 |
| TW | 201134755 | 10/2011 |
| TW | 201134755 A | 10/2011 |
| TW | 201241876 | 10/2012 |
| TW | 201339088 | 10/2013 |

OTHER PUBLICATIONS

"A stretchable carbon nanotube strain sensor for human-motion detection", Takeo Yamada et al.; nature nanotechnology; vol. 6; pp. 296-301.

"Dry-Transfer of Aligned Mul tiwalled Carbon Nanotubes for Flexible Transparent Thin Films", Journal of Nanomaterials; vol. 2012; pp. 1-8.

* cited by examiner

METHOD FOR TRANSFERRING CARBON NANOTUBE ARRAY AND METHOD FOR FORMING CARBON NANOTUBE STRUCTURE

CROSS-REFERENCE TO RELATED APPLICATIONS

This application claims all benefits accruing under 35 U.S.C. §119 from China Patent Application No. 201410147435.9, filed on Apr. 14, 2014 in the China Intellectual Property Office, the contents of which are hereby incorporated by reference.

FIELD

The subject matter herein generally relates to methods for transferring carbon nanotube arrays and methods for forming carbon nanotube structures.

BACKGROUND

Carbon nanotube can be fabricated by drawing from a carbon nanotube array grown on a growing substrate (e.g., silicon wafer), as disclosed by U.S. Pat. No. 8,048,256 to Feng et al. The carbon nanotube film is free standing and includes a plurality of carbon nanotubes joined end-to-end by van der Waals attractive force therebetween. The carbon nanotubes in the carbon nanotube film are substantially aligned along the lengthwise direction of the carbon nanotube film, and thus, the carbon nanotube film has good thermal and electrical conductivity along the direction of the aligned carbon nanotubes. The carbon nanotube film is substantially transparent and can be used as a conductive thin film. Therefore, the carbon nanotube film can be used in many different fields, such as touch panels, liquid crystal displays, speakers, heating devices, thin film transistors, cables, and the like.

BRIEF DESCRIPTION OF THE DRAWINGS

Implementations of the present technology will now be described, by way of example only, with reference to the attached figures, wherein.

DETAILED DESCRIPTION

Figure 1:
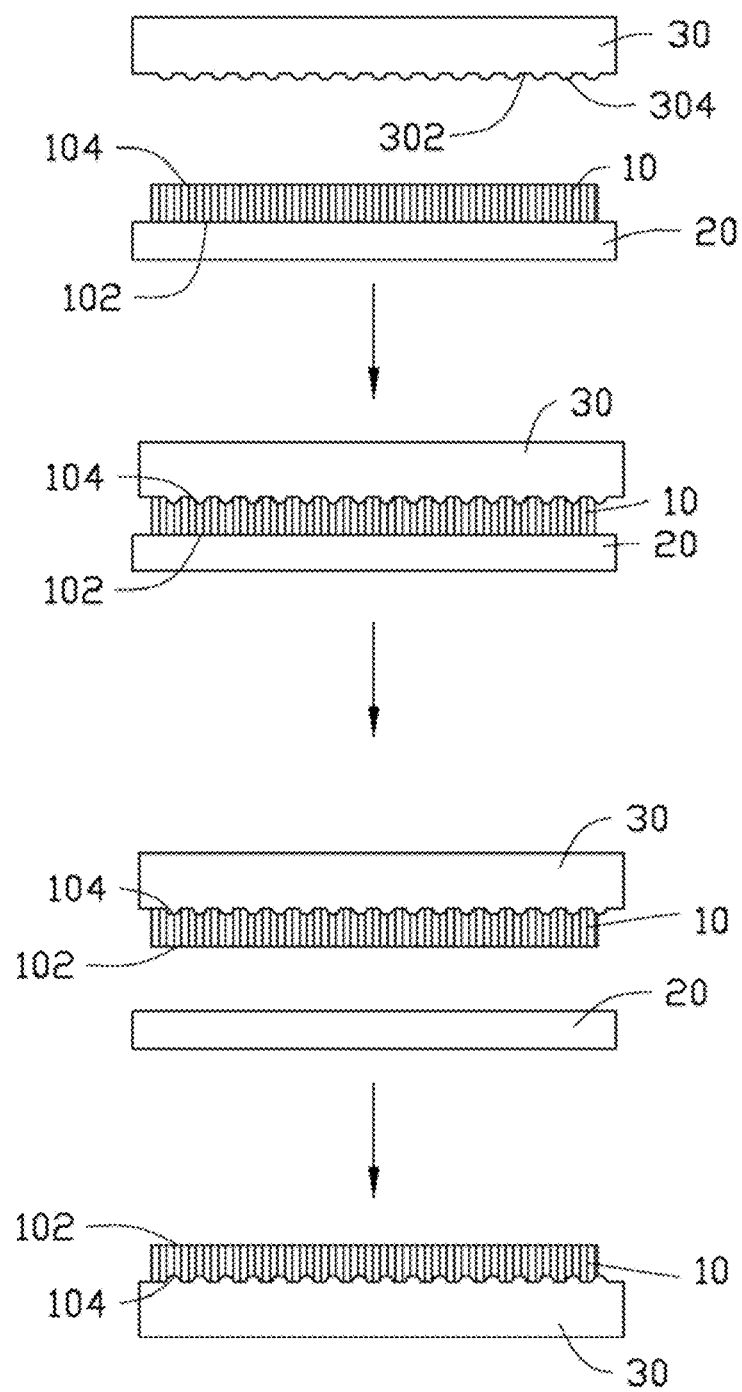
FIG. 1 is a schematic structural view of an embodiment of a method for transferring a carbon nanotube array.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "contact" is defined as a direct and physical contact. The term "substantially" is defined to be essentially conforming to the particular dimension, shape, or other description that is described, such that the component need not be exactly conforming to the description. The term "comprising," when utilized, means "including, but not necessarily limited to"; it specifically indicates open-ended inclusion or membership in the so-described combination, group, series, and the like.

Referring to FIG. 1, the present disclosure is described in relation to a method for transferring a carbon nanotube array 10.

In block S1, a substitute substrate 30 and a growing substrate 20 are provided. The growing substrate 20 has a carbon nanotube array 10 grown thereon, and the carbon nanotube array 10 is in a state that is capable of having the carbon nanotube structure 40 drawn therefrom. The substitute substrate 30 has a surface 302 with a plurality of microstructures 304 located thereon.

In block S2, the carbon nanotube array 10 is transferred from the growing substrate 20 onto the substitute substrate 30. The state of the carbon nanotube array 10 before, during, and after the transfer onto the substitute substrate is still capable of having the carbon nanotube structure 40 drawn therefrom.

The carbon nanotube structure 40 can be a free-standing structure including a plurality of carbon nanotubes joined end-to-end by van der Waals attractive force therebetween. The carbon nanotube structure 40 can be a carbon nanotube film or a carbon nanotube wire.

The carbon nanotube array 10 is grown on the growing substrate 20 by a chemical vapor deposition (CVD) method. The carbon nanotube array 10 includes a plurality of carbon nanotubes oriented substantially perpendicular to a growing surface of the growing substrate 20. The carbon nanotubes in the carbon nanotube array 10 are closely bonded together side-by-side by van der Waals attractive forces. By controlling growing conditions, the carbon nanotube array 10 can be essentially free of impurities such as carbonaceous or residual catalyst particles. Accordingly, the carbon nanotubes in the carbon nanotube array 10 are closely contacting each other, and a relatively large van der Waals attractive force exists between adjacent carbon nanotubes. The van der Waals attractive force is so large that when drawing a carbon nanotube segment (e.g., a few carbon nanotubes arranged side-by-side), adjacent carbon nanotube segments can be drawn out end-to-end from the carbon nanotube array 10 due to the van der Waals attractive forces between the carbon nanotubes. The carbon nanotubes are continuously drawn to form a free-standing and macroscopic carbon nanotube structure 40, which can be in the shape of a film or a wire. The carbon nanotube array 10 that can have the carbon nanotube structure 40 drawn therefrom can be a super aligned carbon nanotube array. A material of the growing substrate 20 can be P-type silicon, N-type silicon, or other materials that are suitable for growing the super aligned carbon nanotube array.

The carbon nanotube structure 40 drawn from the carbon nanotube array 10 includes a plurality of carbon nanotubes joined end-to-end and can be a free-standing carbon nanotube film. The carbon nanotube film includes a plurality of carbon nanotubes substantially aligned along the same direction.

Figure 2:
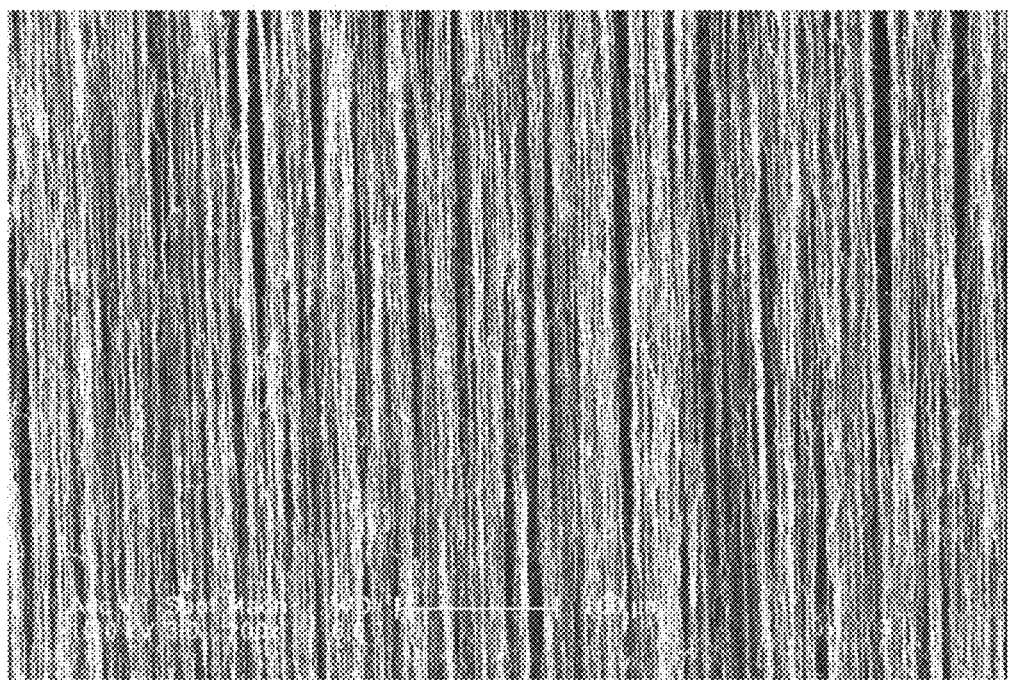
FIG. 2 shows a scanning electron microscope (SEM) image of a carbon nanotube film drawn from a carbon nanotube array.
Figure 3:
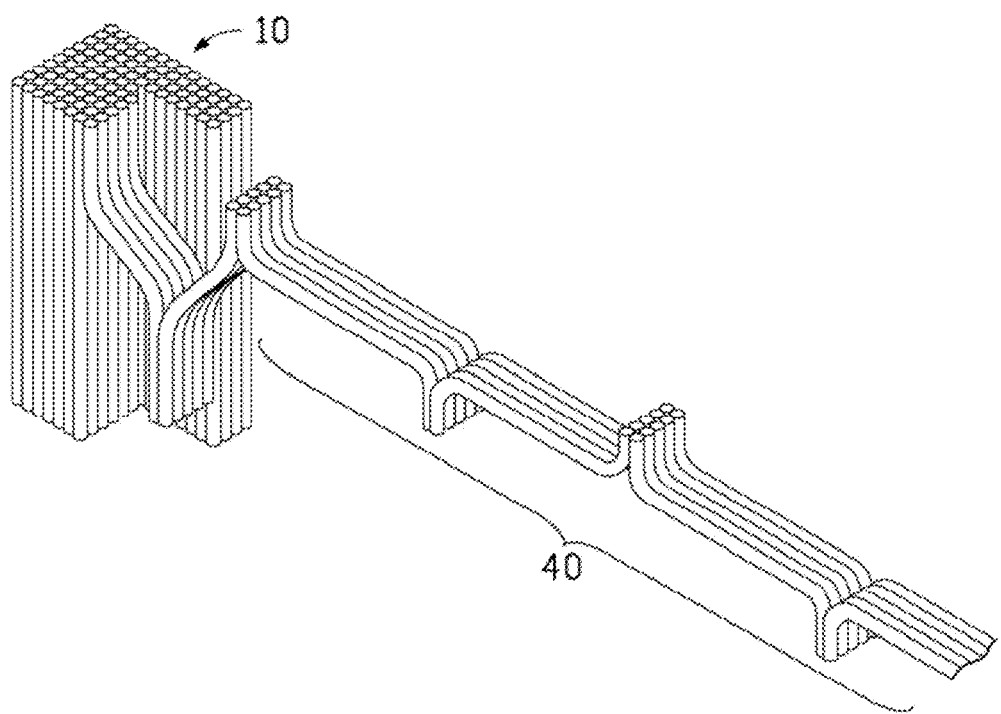
FIG. 3 shows carbon nanotubes joined end-to-end.
Figure 4:
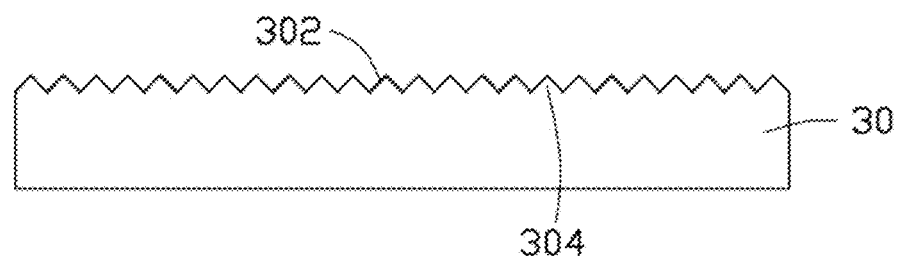
FIG. 4 to FIG. 6 shows schematic side views of embodiments of substitute substrate.
Figure 5:
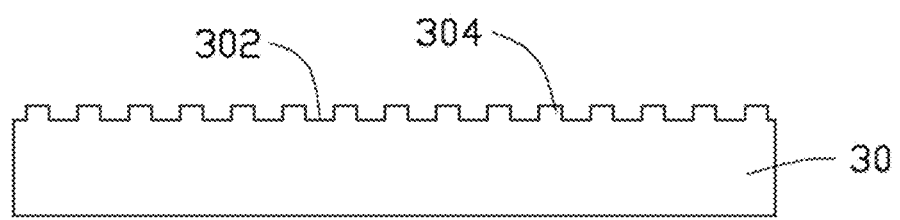
Figure 6:
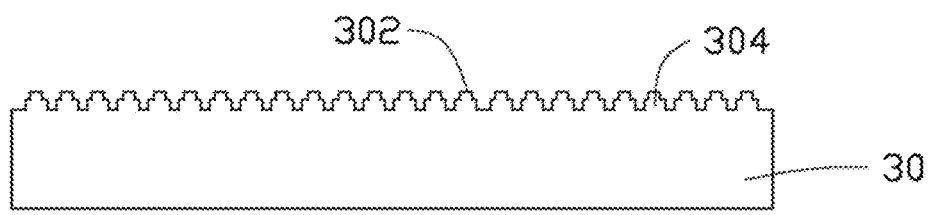

Referring to FIG. 2 and FIG. 3, the carbon nanotube film can include or consist of a plurality of carbon nanotubes. In the carbon nanotube film, the overall aligned direction of a majority of the carbon nanotubes is substantially aligned along the same direction parallel to a surface of the carbon nanotube film. A majority of the carbon nanotubes are substantially aligned along the same direction in the carbon nanotube film. Along the aligned direction of the majority of carbon nanotubes, each carbon nanotube is joined to adjacent carbon nanotubes end to end by van der Waals attractive force therebetween, whereby the carbon nanotube film is capable of being free-standing structure. There may be a minority of carbon nanotubes in the carbon nanotube film that are randomly aligned. However, the number of the randomly aligned carbon nanotubes is very small and does not affect the overall oriented alignment of the majority of carbon nanotubes in the carbon nanotube film. Some of the majority of carbon nanotubes in the carbon nanotube film that are substantially aligned along the same direction may not be exactly straight, and can be curved at a certain degree, or not exactly aligned along the overall aligned direction by a certain degree. Therefore, partial contacts can exist between the juxtaposed carbon nanotubes in the majority of the carbon nanotubes aligned along the same direction in the carbon nanotube film. The carbon nanotube film can include a plurality of successive and oriented carbon nanotube segments. The plurality of carbon nanotube segments are joined end to end by van der Waals attractive force. Each carbon nanotube segment includes a plurality of carbon nanotubes substantially parallel to each other, and the plurality of paralleled carbon nanotubes are in contact with each other and combined by van der Waals attractive force therebetween. The carbon nanotube segment has a desired length, thickness, uniformity, and shape. There can be clearances between adjacent and juxtaposed carbon nanotubes in the carbon nanotube film. A thickness of the carbon nanotube film at the thickest location is about 0.5 nanometers to about 100 microns (e.g., in a range from 0.5 nanometers to about 10 microns). When the carbon nanotube structure 40 has a small width, the carbon nanotube structure 40 can be a free-standing carbon nanotube wire.

The term "free-standing" includes, but is not limited to, a carbon nanotube structure 40 (e.g., film or wire) that does not need to be supported by a substrate. For example, a free-standing carbon nanotube structure 40 can sustain the weight of itself when it is hoisted by a portion thereof without any significant damage to its structural integrity. If the free-standing carbon nanotube structure 40 is placed between two separate supporters, a portion of the free-standing carbon nanotube structure 40 suspended between the two supporters can maintain structural integrity. The free-standing carbon nanotube structure 40 is realized by the successive carbon nanotubes joined end to end by van der Waals attractive force.

In the present disclosure, the growing of the carbon nanotube array 10 and the drawing of the carbon nanotube structure 40 are processed on different structures (i.e., the growing substrate 20 and the substitute substrate 30). The substitute substrate 30 for drawing the carbon nanotube structure 40 can be made of low-price materials, and the growing substrate 20 can be recycled quickly. Thus, production of the carbon nanotube structure 40 can be optimized.

The substitute substrate 30 can be a soft, elastic, or rigid solid substrate. The substitute substrate 30 has a surface to accept the carbon nanotube array 10 thereon. During transferring of the carbon nanotube array 10 from the growing substrate 20 to the substitute substrate 30, the state of the carbon nanotube array 10 is still capable of drawing the carbon nanotube structure 40 from the carbon nanotube array 10 on the substitute substrate 30. That is, the carbon nanotube array 10 transferred to the substitute substrate 30 is still a super aligned carbon nanotube array. The surface of the substitute substrate 30 can be substantially flat.

The carbon nanotube array 10 is arranged upside down on the surface of the substitute substrate 30. The carbon nanotubes are grown from the growing surface of the growing substrate 20 to form the carbon nanotube array 10. The carbon nanotube includes a bottom end adjacent or contacting the growing substrate 20 and a top end away from the growing substrate 20. The bottom ends of the carbon nanotubes form the bottom surface 102 of the carbon nanotube array 10, and the top ends of the carbon nanotubes form the top surface 104 of the carbon nanotube array 10. After the carbon nanotube array 10 is transferred to the substitute substrate 30, the top surface 104 of the carbon nanotube array 10 is now adjacent to or contacting the substitute substrate 30, and the bottom surface 102 of the carbon nanotube array 10 is now away from the substitute substrate 30.

In block S2, the carbon nanotube array 10 can be transferred from the growing substrate 20 to the substitute substrate 30 at room temperature (e.g., 10° C. to 40° C.). Block S2 can include blocks S21 and S22.

In block S21, the substitute substrate 30 and the carbon nanotube array 10 on the growing substrate 20 are brought together such that the surface 302 of the substitute substrate 30 and the top surface 104 of the carbon nanotube array 10 are contacting each other.

In block S22, the substitute substrate 30 and the growing substrate 20 are moved away from each other, thereby separating the carbon nanotube array 10 from the growing substrate 20.

The surface of the substitute substrate 30 and the top surface 104 of the carbon nanotube array 10 can be bonded by van der Waals attractive forces, and a bonding force ($F_{BC}$) between the carbon nanotube array 10 and the substitute substrate 30 is smaller than the van der Waals attractive forces ($F_{CC}$) between the carbon nanotubes in the carbon nanotube array 10. Meanwhile, the $F_{BC}$ is larger than the bonding force ($F_{AC}$) between the carbon nanotube array 10 and the growing substrate 20, to separate the carbon nanotube array 10 from the growing substrate 20. Therefore, $F_{AC} < F_{BC} < F_{CC}$ must satisfied. The substitute substrate 30 can generate enough bonding force (e.g., van der Waals attractive force) with the carbon nanotube array 10 simply by contacting the carbon nanotube array 10.

Figure 7:
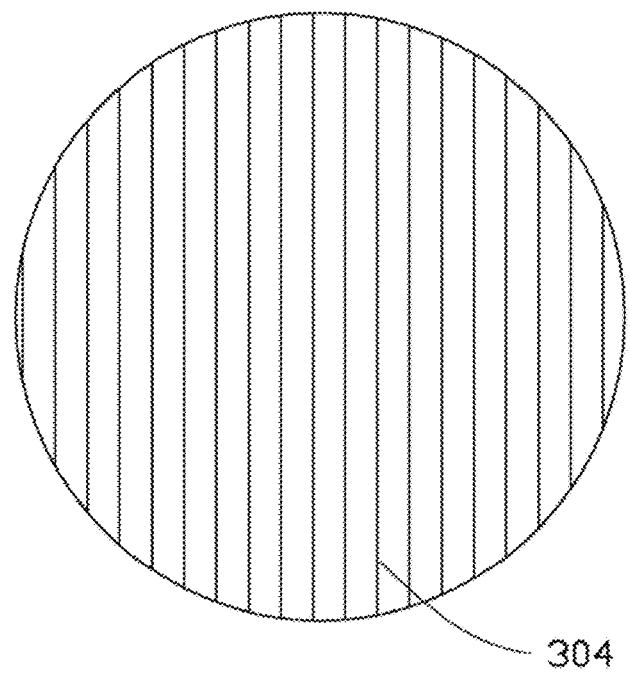
FIG. 7 to FIG. 8 shows schematic top views of embodiments of substitute substrate.
Figure 8:
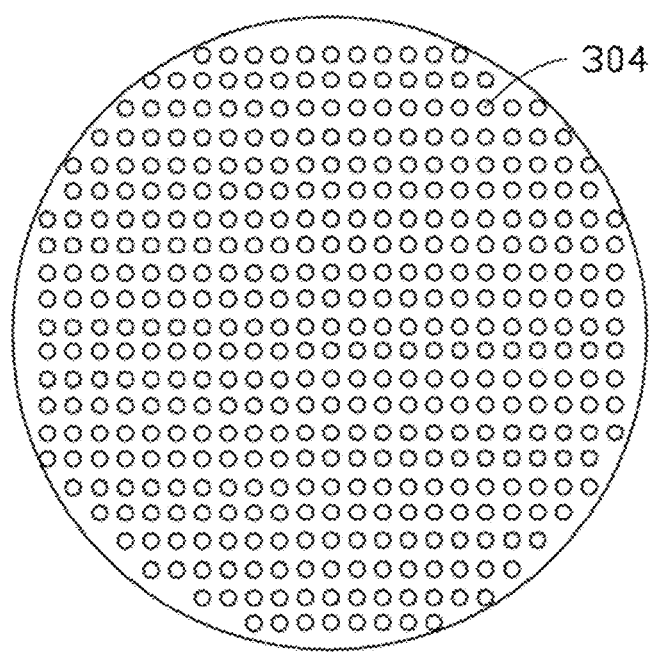

To satisfy $F_{AC}<F_{BC}<F_{CC}$, the substitute substrate 30 can increase the surface area of the surface 302 by using the microstructures 304, thus increases the $F_{BC}$. The microstructure 304 can have a point shape and/or a long and narrow shape, and can be protrusions and/or recesses. Referring to FIG. 1 and FIGS. 4 to 6, the cross section of the microstructures 304 can be semicircular, rectangular, conical, and/or stepped. The microstructures 304 can be hemispheres, convex or concave columns, pyramids, pyramids without tips, and any combination thereof. Referring to FIG. 7, in one embodiment, the microstructures 304 can be parallel and spaced grooves. Referring to FIG. 8, in another embodiment, the microstructures 304 can be uniformly spaced hemispherical protrusions. The plurality of microstructures 304 are uniformly distributed on the surface 304 of the substitute substrate 30. In one embodiment, the surface 302 having the microstructures 304 located thereon has a surface area of 30% to 120% more than a smooth surface. The surface 302 sufficiently contacts the top surface 104 of the carbon nanotube array 10. The material of the substitute substrate 30 is not limited and can be at least one of metal, glass, crystal, ceramic, silicon, silicon dioxide, plastic, and resin, such as polymethyl methacrylate and polyethylene terephthalate.

The height of the protrusion and the depth of the recess of the microstructures 304 can be 0.5% to 10% of the height of the carbon nanotube array 10. In one embodiment, the height of the protrusion and the depth of the recess can be in a range from about 5 microns to about 50 microns. The surface 302 needs an overall flatness to sufficiently contact the top surface 104 of the carbon nanotube array 10. The microstructures 304 can be formed on the surface 302 by laser etching, chemical etching, or lithography.

To satisfy $F_{AC}<F_{BC}<F_{CC}$, the substitute substrate 30 can have a suitable surface energy and a suitable interface energy can exist between the substitute substrate 30 and the carbon nanotube array 10. In one embodiment, the material of the substitute substrate 30 is poly(dimethylsiloxane) (PDMS).

The substitute substrate 30 can adhere to the carbon nanotube array 10 without an adhesive binder and only by van der Waals attractive forces. Although the adhesive binder can have a bonding force with the carbon nanotube array greater than the bonding force between the carbon nanotube array 10 and the growing substrate 20, because the van der Waals attractive force between the carbon nanotubes in the carbon nanotube array 10 is small, the adhesive binder must have a bonding force with the carbon nanotube array 10 sufficiently less than the bonding force $F_{CC}$ between the carbon nanotubes in the carbon nanotube array 10. Otherwise, the carbon nanotube structure 40 cannot be drawn from the transferred carbon nanotube array 10.

In blocks S21 and S22, the substitute substrate 30 can always be in a solid state.

In block S21, to ensure almost all the top ends of the carbon nanotubes in the carbon nanotube array 10 have sufficient contact with the surface of the substitute substrate 30, a pressing force (f) can be applied to the carbon nanotube array 10 by the substitute substrate 30. The pressing force f cannot be too large to ensure the state of the carbon nanotube array 10 is still capable of drawing the carbon nanotube structure 40 when transferred to the substitute substrate 30. The pressing force can satisfy $0<f<2N/cm^2$. The direction of the pressing force can be substantially perpendicular to the growing surface of the growing substrate 20 (i.e., along the length direction of the carbon nanotubes). The pressing force is not to press the carbon nanotubes down or vary the length direction of the carbon nanotubes in the carbon nanotube array 10, otherwise the state of the carbon nanotube array 10 could change. During the pressing of the carbon nanotube array 10, the carbon nanotubes in the carbon nanotube array 10 are still substantially perpendicular to the growing surface of the growing substrate 20.

The microstructures 304 make the surface 302 of the substitute substrate 30 rough. When the recessed portion of the surface 302 is in contact with the top surface 104 of the carbon nanotube array 10, the protruded portion of the surface 302 may slightly curve the carbon nanotubes contacting the protruded portion. However, the microstructures 304 are small, so the curve is small, and when the substitute substrate 30 and the growing substrate 20 are separated, the carbon nanotubes can elastically restore to a substantially straight shape and the carbon nanotube array 10 can restore to its original height. Thus, the state of the carbon nanotube array 10 is still capable of having the carbon nanotube structure 40 drawn from the carbon nanotube array 10.

In block S22, a majority of the carbon nanotubes in the carbon nanotube array 10 can be detached from the growing substrate 20 at the same time by cutting means, or moving either the substitute substrate 30 or the growing substrate 20, or both, away from each other along a direction substantially perpendicular to the growing surface of the growing substrate 20. The carbon nanotubes of the carbon nanotube array 10 are detached from the growing substrate 20 along the growing direction of the carbon nanotubes. When both the substitute substrate 30 and the growing substrate 20 separate, the two substrates both moves along the direction perpendicular to the growing surface of the growing substrate 20 and depart from each other.

Figure 9:
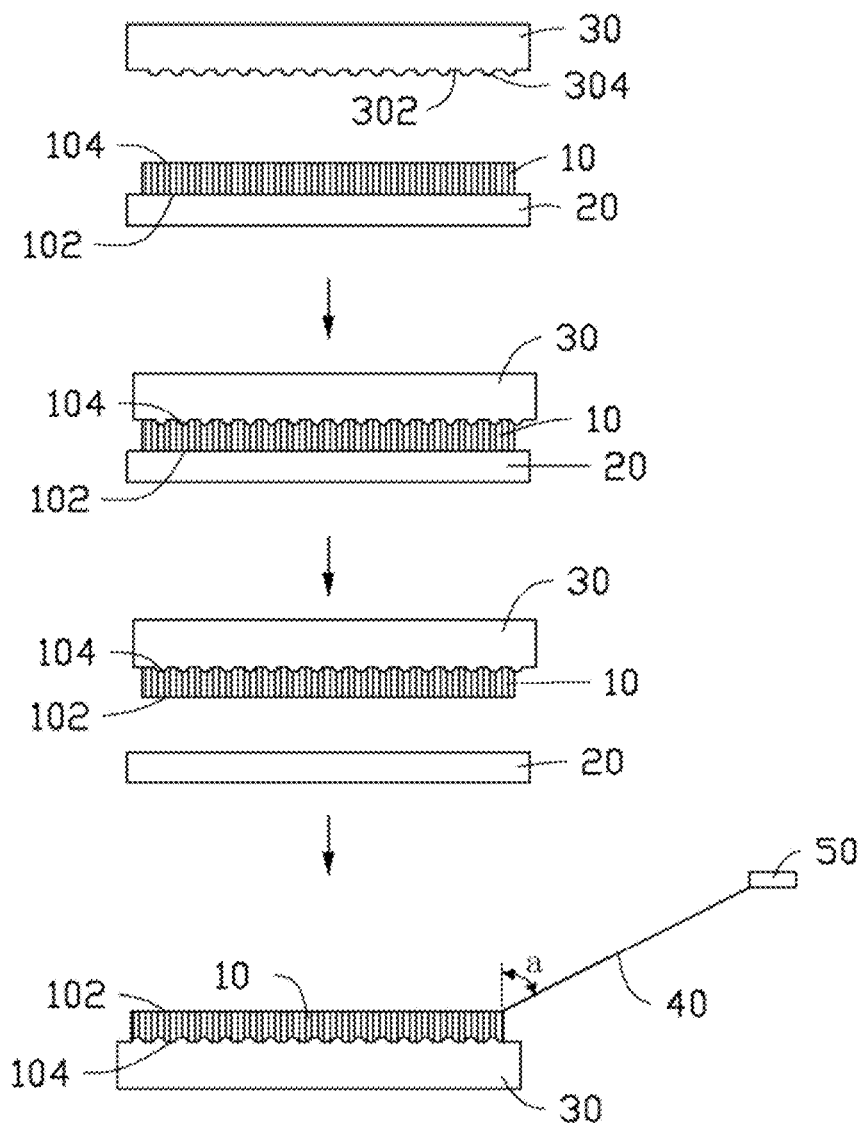
FIG. 9 is a schematic structural view of an embodiment of a method for forming a carbon nanotube structure.

Referring to FIG. 9, the present disclosure is described in relation to a method for forming a carbon nanotube structure 40 including the previously described blocks S1 and S2, and further including block S3. In block S3, the carbon nanotube structure 40 is drawn from the carbon nanotube array 10 on the substitute substrate 30.

Figure 10:
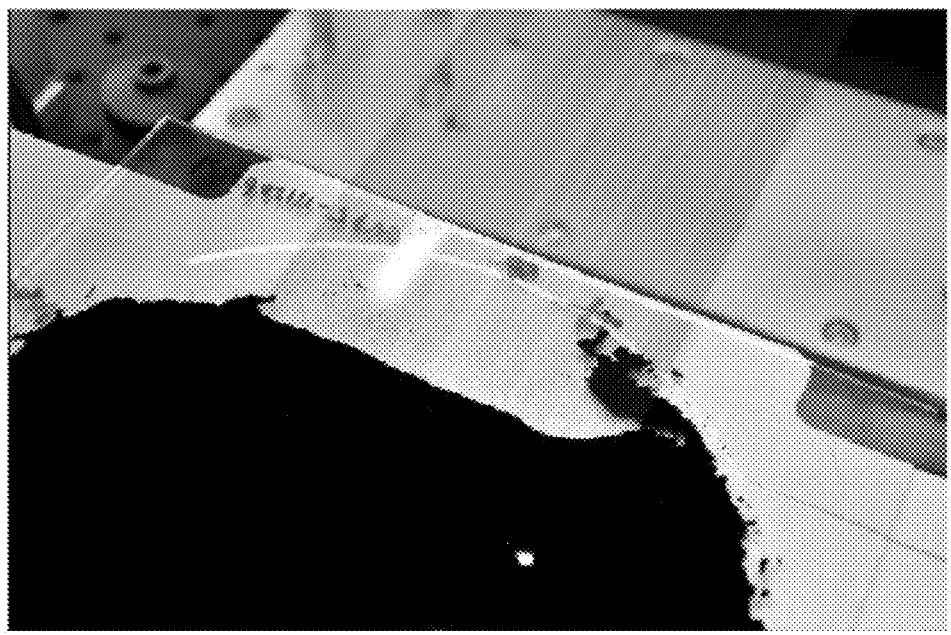
FIG. 10 shows an optical photo of drawing the carbon nanotube film from the carbon nanotube array transferred to a substitute substrate.

Referring to FIG. 10, in the block S3, the carbon nanotube structure 40 is drawn from the carbon nanotube array 10 that was transferred to the substitute substrate 30, not from the carbon nanotube array 10 located on the growing substrate 20. In one embodiment of block S3, the carbon nanotube structure 40 can be drawn from the carbon nanotube array 10 upside down on the surface of the substitute substrate 30 (i.e., drawn from the bottom surface 102 of the carbon nanotube array 10).

In block S3, a carbon nanotube segment having a predetermined width is drawn from the carbon nanotube array 10 on the substitute substrate 30. The segment is selected using a drawing tool 50 (e.g., adhesive tape, pliers, tweezers, or other tool allowing multiple carbon nanotubes to be gripped and pulled simultaneously). In block S32, a plurality of carbon nanotube segments joined end to end by van der Waals attractive force is drawn by moving the drawing tool 50, thereby forming a continuous carbon nanotube structure 40.

The carbon nanotube segment includes a single carbon nanotube or a plurality of carbon nanotubes substantially parallel to each other. The drawing tool 50 such as adhesive tape can be used for selecting and drawing the carbon nanotube segment. The adhesive tape may contact with the carbon nanotubes in the carbon nanotube array to select the carbon nanotube segment. The drawing tool 50 can select a large width of carbon nanotube segments to form the carbon nanotube film, or a small width of the carbon nanotube segments to form the carbon nanotube wire.

An angle between a drawing direction of the carbon nanotube segments and the growing direction of the carbon nanotubes in the carbon nanotube array 10 can be larger than 0 degrees (e.g., 30° to 90°).

Block S2 is different from block S3. The purpose of block S2 is to separate the carbon nanotube array 10 as a whole from the growing substrate 20. The carbon nanotube array 10 separated from the growing substrate 20 still in the array shape. The purpose of block S3 is to draw out carbon nanotubes one by one or segment by segment to form a carbon nanotube film or wire from the carbon nanotube array 10 on the substitute substrate 30.

In the present method for making the carbon nanotube structure 40, the growing of the carbon nanotube array 10 and the drawing of the carbon nanotube structure 40 can be processed on different substrates. The substitute substrate 30 can be made of cheap material, and the expensive growing substrate 20 can be recycled quickly and used again for growing new carbon nanotube arrays 10, thus speeding up the production of the carbon nanotube arrays.

Depending on the embodiment, certain of the blocks of the methods described may be removed, others may be added, and the sequence of blocks may be altered. It is also to be understood that the description and the claims drawn to a method may include some indication in reference to certain blocks. However, the indication used is only to be viewed for identification purposes and not as a suggestion as to an order for the blocks.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A method for transferring a carbon nanotube array, the method comprising:
    providing a substitute substrate, a growing substrate, and a carbon nanotube array grown on the growing substrate, the carbon nanotube array having a bottom surface adjacent to the growing substrate and a top surface away from the growing substrate, the carbon nanotube array being configured for drawing a carbon nanotube structure therefrom, the carbon nanotube structure comprising a plurality of carbon nanotubes joined end to end, the substitute substrate having a surface having a plurality of microstructures located thereon; and
    transferring the carbon nanotube array from the growing substrate to the substitute substrate, the carbon nanotube array still being configured for drawing the carbon nanotube structure from the substitute substrate, comprising:
        contacting the surface of the substitute substrate to the top surface of the carbon nanotube array; and
        separating the substitute substrate from the growing substrate, thereby separating the bottom surface of the carbon nanotube array from the growing substrate.

2. The method of claim 1, wherein the carbon nanotube structure is a carbon nanotube film or a carbon nanotube wire.

3. The method of claim 1, wherein the surface of the substitute substrate and the top surface of the carbon nanotube array are combined only by van der Waals attractive forces.

4. The method of claim 1, wherein the plurality of microstructures are protrusions or recesses on the surface of the substitute substrate.

5. The method of claim 1, wherein a cross section of each of the plurality of microstructures is selected from the group consisting of semicircular, rectangular, conical, and stepped.

6. The method of claim 1, wherein the plurality of microstructures are parallel line shaped grooves.

7. The method of claim 1, wherein the plurality of microstructures are uniformly spaced protrusions.

8. The method of claim 1, wherein a height or a depth of the plurality of microstructures is 0.5% to 10% of a height of the carbon nanotube array.

9. The method of claim 1, wherein the carbon nanotube array comprises a plurality of carbon nanotubes, and during the separating the carbon nanotube array from the growing substrate, substantially all carbon nanotubes are simultaneously detached from the growing substrate.

10. The method of claim 1, wherein the carbon nanotube array comprises a plurality of carbon nanotubes, and the carbon nanotubes of the carbon nanotube array are detached from the growing substrate along a growing direction of the carbon nanotubes.

11. The method of claim 1, wherein the growing substrate comprises a growing surface for growing the carbon nanotube array, a moving direction of at least one of the substitute substrate and the growing substrate is substantially perpendicular to a growing surface of the growing substrate during the moving of the at least one of the substitute substrate and the growing substrate.

12. The method of claim 1, wherein a bonding force between the substitute substrate and the carbon nanotube array is larger than a bonding force between the growing substrate and the carbon nanotube array, and is smaller than van der Waals attractive force between carbon nanotubes in the carbon nanotube array.

13. A method for transferring a carbon nanotube array, the method comprising:
    providing a first substrate, a second substrate, and a carbon nanotube array grown on the first substrate, the carbon nanotube array having a bottom surface adjacent to the first substrate and a top surface away from the first substrate, the carbon nanotube array being configured for drawing a carbon nanotube structure therefrom, the carbon nanotube structure comprising a plurality of carbon nanotubes joined end to end, the second substrate has a surface having a plurality of microstructures located thereon; and
    transferring the carbon nanotube array from the first substrate to the second substrate, the carbon nanotube array still being configured for drawing the carbon nanotube structure from the second substrate, comprising:
        contacting the surface of the substitute substrate to the top surface of the carbon nanotube array; and
        separating the second substrate from the first substrate, thereby separating the bottom surface of the carbon nanotube array from the first substrate.

14. A method for forming a carbon nanotube structure, the method comprising:

providing a substitute substrate, a growing substrate, and a carbon nanotube array grown on the growing substrate, the carbon nanotube array having a bottom surface adjacent to the growing substrate and a top surface away from the growing substrate, the carbon nanotube array being configured for drawing a carbon nanotube structure therefrom, the carbon nanotube structure comprising a plurality of carbon nanotubes joined end to end, the substitute substrate has a surface having a plurality of microstructures located thereon;

transferring the carbon nanotube array from the growing substrate to the substitute substrate, the carbon nanotube array still being configured for drawing the carbon nanotube structure from the substitute substrate, comprising:

contacting the surface of the substitute substrate to the top surface of the carbon nanotube array; and separating the substitute substrate from the growing substrate, thereby separating the bottom surface of the carbon nanotube array from the growing substrate; and drawing the carbon nanotube structure from the carbon nanotube array on the substitute substrate.

\* \* \* \* \*